Oct. 11, 1960
F. L. GUSTINE
2,955,501
CAM ACTUATED CUTTER FOR CUTTING LAYERS OF
SPIRAL WOUND INSULATION ON A CABLE
Filed Nov. 28, 1955
3 Sheets-Sheet 1
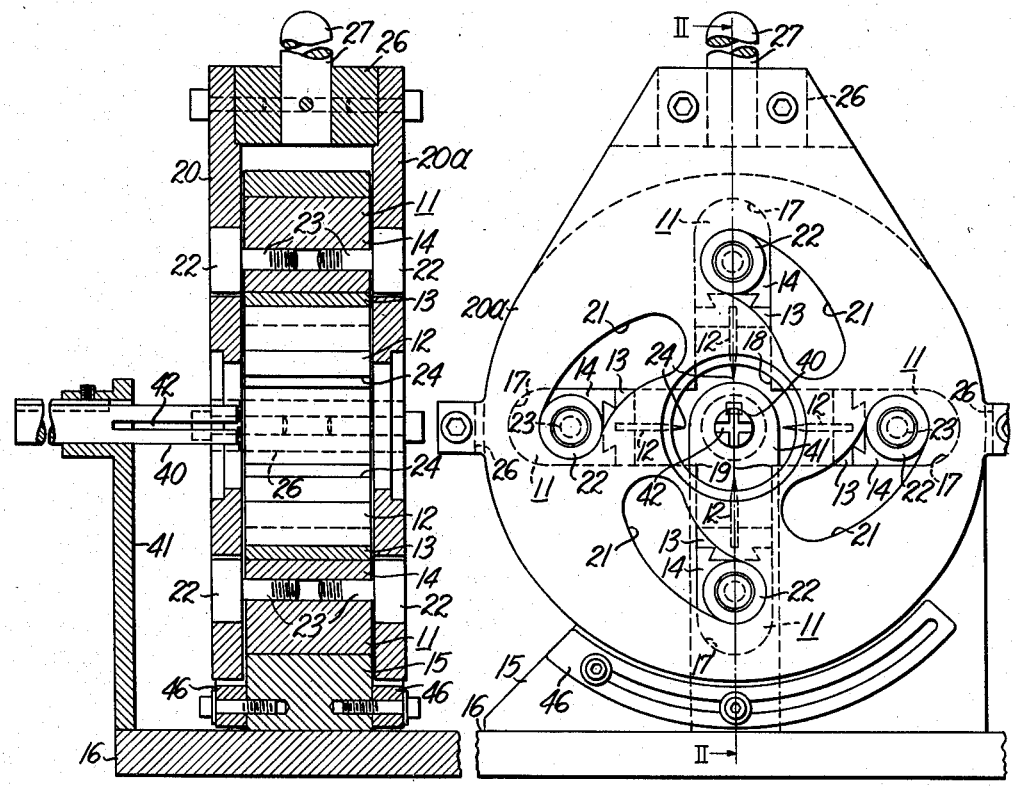
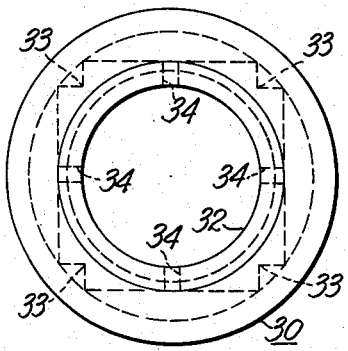
Fig.3
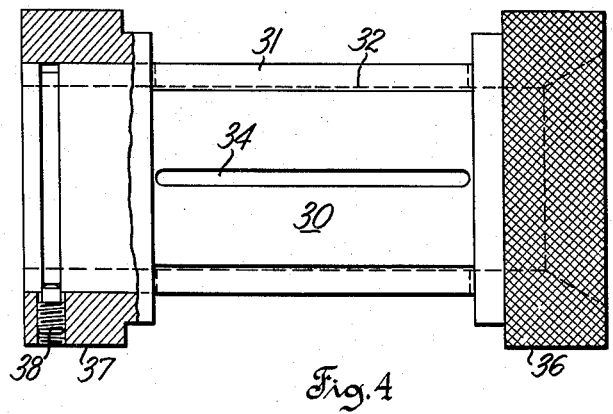
Fig.4
Inventor
Floyd L. Gustine
by Richard E. Cummins
Attorney

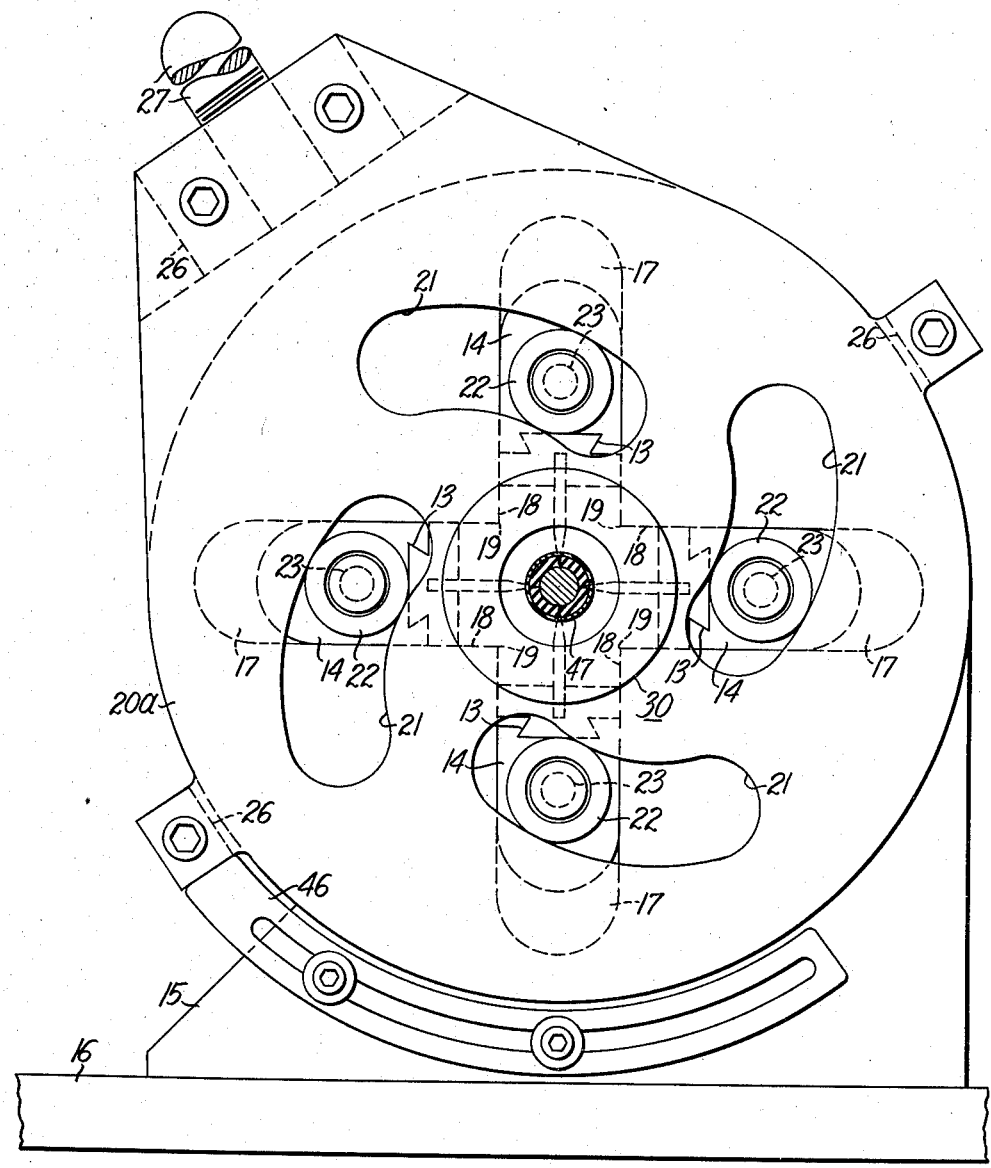
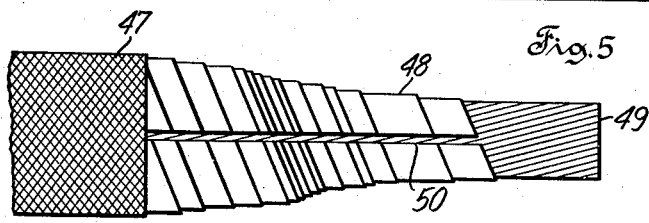

Oct. 11, 1960  F. L. GUSTINE  2,955,501
CAM ACTUATED CUTTER FOR CUTTING LAYERS OF
SPIRAL WOUND INSULATION ON A CABLE
Filed Nov. 28, 1955  3 Sheets-Sheet 3

Inventor
Floyd L. Gustine
By Huston L. Swenson
Attorney

United States Patent Office 2,955,501
Patented Oct. 11, 1960

2,955,501

CAM ACTUATED CUTTER FOR CUTTING LAYERS OF SPIRAL WOUND INSULATION ON A CABLE

Floyd L. Gustine, Broughton, Pa., assignor to Allis-Chalmers Manufacturing Company, Milwaukee, Wis.

Filed Nov. 28, 1955, Ser. No. 549,324

2 Claims. (Cl. 83—628)

This invention relates in general to cable insulation strippers and in particular to a device and method of tapering the end portion of a cable which is wrapped with spiral insulation.

An object of the present invention is to provide an improved device for tapering the insulation at the end portion of a cable.

Another object of the present invention is to provide an improved method for making a conical termination at the end of the cable which has spirally wound insulation.

In accordance with the above objects the preferred embodiment of the improved device includes generally means for making a plurality of axially aligned circumferentially spaced cuts through insulation which is wound spirally in layers on the cable. Because of the spiral wrapping of the insulation on the conductive portion of the cable the portion of the insulation which is cut, readily flakes off and the uncut portion of the insulation closes in about the conductor forming a cone making the conductor more suitable for taping.

Objects and advantages other than those mentioned above will be apparent from the following description when read in connection with the drawing in which:

Fig. 1 is a front view in elevation of the preferred embodiment of the invention;

Fig. 2 is a section taken along lines II—II of Fig. 1;

Fig. 3 is an enlarged front view in elevation of the cable adapter omitted in Figs. 1 and 2;

Fig. 4 is an end view partly in section of the adapter shown in Fig. 3;

Fig. 5 is an enlarged view of the device shown in Fig. 1 illustrating the position of the cable and cable adapter with respect to the device;

Fig. 6 is a view of the cable after it has been cut and immediately prior to taping.

The device shown in Figs. 1 and 2 comprises generally a plurality of knife assemblies, a knife assembly support and means for moving the knife assemblies radially into engagement with an insulated cable to provide a plurality of axially aligned circumferentially spaced cuts through the spiral wound insulation.

Figure 7:
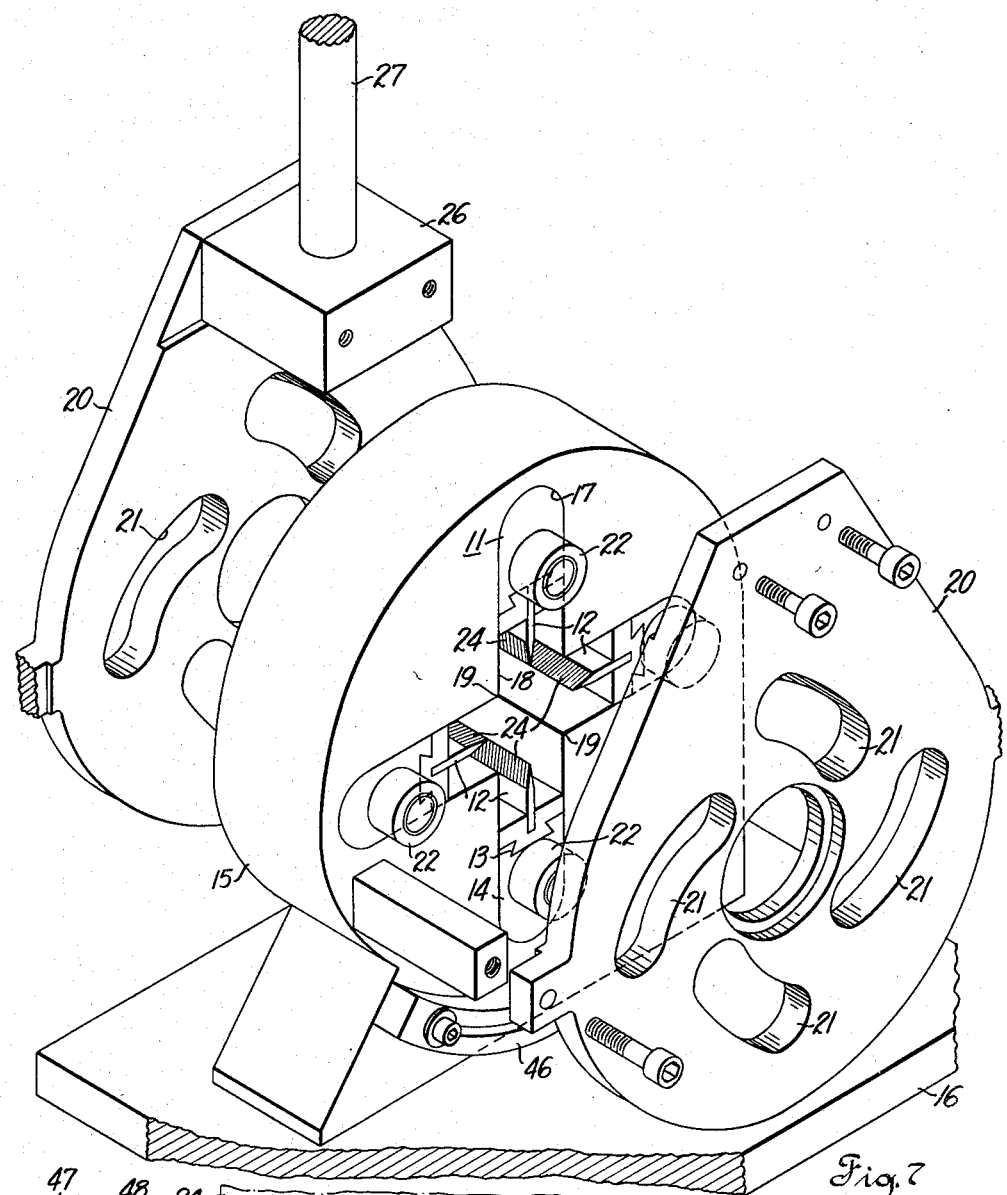
Fig. 7 is an enlarged exploded isometric view of the preferred embodiment of the invention.

In the preferred embodiment shown in Fig. 1 the device is provided with four knife assemblies 11 which are similar so only one is described. As illustrated more clearly in Fig. 7 each knife assembly 11 comprises a blade 12, a blade holder 13 and a guide block 14. The blade 12 is fixedly attached in the blade holder 13 which in turn is removably secured to the guide block 14 by a dovetail construction.

The knife assembly support includes a vertically disposed plate 15 which is attached to a suitable base member 16. The plate is provided with a plurality of slots 17 extending radially outward from a predetermined axis. As shown, plate 15 is provided with four radially extending slots which are spaced ninety degrees to each other, the sides 18 of any particular slot intersecting the sides of adjacent slots to form square corners 19. The knife assemblies 11 are adapted to be disposed in the slots 17 in sliding engagement therewith.

The means for moving the knife assemblies 11 radially inward and outward comprises a pair of cam plates 20 provided with spiral cam slots 21 and a pair of cam followers 22 associated with each knife assembly 11. The cam followers 22 are rotatably mounted on trunnions 23 which are fixedly secured in the guide block 14 of the knife assembly with the axis of the trunnions 23 parallel to the cutting edge 24 of the blade 12. The cam plates 20 are disposed adjacent to the knife assembly support 15 with the cam followers 22 disposed in the cam slot 21, thereby maintaining the knife assemblies in sliding engagement with guide slots 17. The cam plates 20 are fixed with respect to each other so as to move as a unit by means of spacing blocks 26 one of which may be provided with a handle 27.

The device is further provided with a cable adapter 30 which is removably disposed coaxially with the reference axis of the machine. As shown separately in Figs. 3 and 4, the adapter comprises a substantially rectangular block 31 having an accurate lengthwise passage 32 of a diameter to accommodate the size of cable to be cut. The block 31 is notched at each corner 33 to mate with the square corners 19 formed by the sides 18 of the guide slots 17. The block 31 is provided with a plurality of slits 34 which are in registry with the knife blades 12 to allow the blades to enter the cable receiving passage 32. Each end of the block 31 may be provided with flanges to position the slits 34 lengthwise with respect to the knife blades 12. As shown, the block has a first flange 36 fixedly secured to one end of the block and a second flange 37 removably secured to the other end. The block is fitted into the device so that the flange 36 abuts the forward cam plate 20a and the removable flange 37 is then attached to the block by a set screw 38 and the two flanges 36, 37 cooperate to position the block 31 with respect to the knife blades 12.

If various sized cables are to be handled by the device a plurality of similar cable adapters 30 are provided, the diameters of the cable receiving passage 32 corresponding to the outside diameter of the cables to be cut.

If desired, means may be provided for limiting the length of the cuts that are made parallel to the axis of the cable. As shown more readily in Fig. 2, this means comprises a rod 40 which is inserted into the cable adapter 30 thereby limiting the length of cable that may be inserted into the device. The rod is held in position by a suitable support 41 which allows the rod to move axially with respect to the conductor receiving passage. The end of the rod is provided with four axially extending slots 42 which allow the knife blades 12 to pass through the rod.

The device may also be provided with means for limiting the depth of cuts which the knife blades 12 make through the insulation. As shown, the radially inward movement of the knife blades 12 may be limited by adjustable stops 46 which prevent the cam plates 20 from turning more than a predetermined amount.

In operation the device provides four axial cuts through an insulated cable 47 as shown in Fig. 5 which is a front view of the device shown in Figs. 1 and 2, provided with the cable adapter 30 shown in Figs. 3 and 4.

Fig. 6 shows the cable 47 immediately prior to applying the tape. The cone shape taper of the insulation 48 results from traversely cutting the insulation which was wound on the cable spirally with respect to the axis of the conductor 49 in a predetermined number of layers. By making four cuts 50 spaced ninety degrees around the circumference of the cable, certain of the cut portions of the insulation flake off rather easily. The uncut portions of the insulation and the partially cut portions of the insulation of the outer layers close in about the conductor forming a cone. The conical termination of the insulation provides for a taping operation which is strong electrically in that the creep path along the conical surface is greater than that along the normal to the conductor. The taping is also strong from a mechanical standpoint because each successive layer of tape is wound over a progressively longer length of cable.

Figure 8:
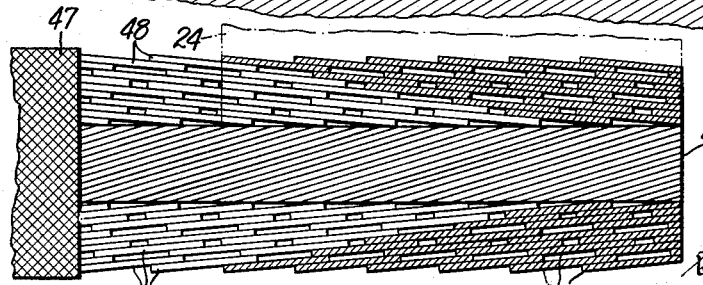
Fig. 8 is an enlarged exaggerated cross sectional view taken along the axis of a spirally wound cable similar to that illustrated in Fig. 6.

Fig. 8 illustrates the manner in which a conical termination is formed after the cable insulation has been cut. For purposes of explanation the portions of insulation 52 which flake off have been crosshatched and those portions 48 which remain have been left blank. As shown, an axially extending radially positioned blade 24 has made a cut through a number of layers of insulation. Strips of insulation with their widths lying completely within the path of the blade are entirely severed. In fact, a number of continuous strips are severed at several points inasmuch as they each individually form a number of turns within the width of the blade.

Attention is called to the fact that in spirally wound cable insulation, each turn, in addition to being bound by succeeding layers, is also bound by several succeeding adjacent turns in the same layer. It is this characteristic which cooperates with my invention to provide a conical termination. After the necessary cuts are made in the insulation the cut portion of insulation is flaked by hand or other suitable means. The first or outermost layer of insulation will flake off. In the next or second from the outermost layer all of the turns with the exception of turns furthermost from the cable end 49 flake off. A relatively few turns in the second layer remain, although some are completely severed, as they are held in place by partially uncut turns in the first layer and also by adjacent overlapping turns. In the third layer additional turns are held in place by the secured second layer turns. In each succeeding layer the number of turns remaining builds up progressively because of the increase in pressure exerted by the preceding layers. The resulting conical termination comprises a substantial number of completely severed turns. However, these turns have not flaked off because of preceding turns wrapped about them which are, in turn, held by uncut and partially cut adjacent and preceding turns. The slope of the finished insulation represents in effect the manner in which points of a certain uniform force exerted by cut insulation 52 increase in depth in approaching the cable end 49.

While only one embodiment of the present invention has been illustrated and described it will be apparent to those skilled in the art that modifications other than those shown may be made therein without departing from the spirit of the invention or from the scope of the appended claims.

It is claimed and desired to secure by Letters Patent:

1. A device for tapering the terminal portion of an electrical conductor having a plurality of overlapping layers of paper strips wound spirally with respect to the axis of said cable, said device comprising a plurality of knife blades disposed in angularly spaced radially extending planes, means for maintaining said knife blades in their respective planes comprising a stationary plate provided with radially disposed angularly spaced axially extending slots and knife blade supports fixedly attached to said knife blades and disposed in sliding engagement in said slots, a removable adapter means nonrotatably attached to said stationary plate for positioning said terminal portion on a predetermined axis comprising a member defining a passage for closely accommodating said terminal portion, said member having slits in registry with said knife blades, means for moving said knife blades radially inward and outward comprising a cam plate rotatably mounted on said stationary plate, said cam plate having spirally disposed cam slots, and a cam follower associated with each said knife blade support and positioned in said cam slot, and means attached to said cam plate for rotating said cam plate with respect to said stationary plate in a plane normal to said predetermined axis to cause said knife blades to be moved radially inward into cutting engagement with said cable to provide a plurality of axially aligned cuts through said paper strips.

2. A device for tapering the terminal portion of an electrical conductor having a plurality of overlapping layers of paper strips wound spirally with respect to the axis of said cable, said device comprising a plurality of knife blades disposed in angularly spaced radially extending planes, means for maintaining said knife blades in their respective planes comprising a stationary plate provided with radially disposed angularly spaced axially extending slots and knife blade supports fixedly attached to said knife blades and disposed in sliding engagement in said slots, a removable adapter means nonrotatably attached to said stationary plate for positioning said terminal portion on a predetermined axis comprising a member defining a passage for closely accommodating said terminal portion, said member having slits maintained in registry with said knife blades by a flange at an end of said member in mating relationship with said stationary plate, means for moving said knife blades radially inward and outward comprising a pair of cam plates rotatably mounted on said stationary plate, said cam plates having spirally disposed cam slots, and a pair of cam followers associated with each said knife blade support and positioned in said cam slots, and means attached to said cam plates for rotating said cam plates with respect to said stationary plate in planes normal to said predetermined axis to cause said knife blades to be moved radially inward into cutting engagement with said cable to provide a plurality of axially aligned cuts through said paper strips.

References Cited in the file of this patent

UNITED STATES PATENTS

| | | |
|---|---|---|
| 857,284 | Huber | June 18, 1907 |
| 1,182,135 | Bosler et al. | May 9, 1916 |
| 1,459,240 | Nonneman | June 19, 1923 |
| 1,941,364 | Nunninghoff | Dec. 26, 1933 |
| 2,042,018 | Papst | May 26, 1936 |
| 2,057,011 | Corwin | Oct. 13, 1936 |
| 2,086,104 | Wensley | July 6, 1937 |
| 2,288,670 | Babiary | July 7, 1942 |
| 2,383,165 | Schuyler | Aug. 21, 1945 |
| 2,391,721 | Lundeen | Dec. 25, 1945 |
| 2,401,149 | Gordon | May 28, 1946 |
| 2,569,566 | Hoffman | Oct. 2, 1951 |
| 2,744,576 | Kreigh | May 8, 1956 |